United States Patent
Vohra et al.

(10) Patent No.: US 10,169,779 B2
(45) Date of Patent: Jan. 1, 2019

(54) METHODS AND APPARATUS FOR DISPLAYING IN-PRODUCT MESSAGES BASED ON AN INDIVIDUAL'S PAST MESSAGE INTERACTION

(71) Applicant: Adobe Systems Incorporated, San Jose, CA (US)

(72) Inventors: Lalit Vohra, New Delhi (IN); Abhishek Modi, Jhunjhunu (IN); Rajeev Sharma, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 519 days.

(21) Appl. No.: 14/177,955

(22) Filed: Feb. 11, 2014

(65) Prior Publication Data
US 2015/0227971 A1    Aug. 13, 2015

(51) Int. Cl.
*G06Q 30/02*    (2012.01)

(52) U.S. Cl.
CPC ..... *G06Q 30/0255* (2013.01); *G06Q 30/0269* (2013.01)

(58) Field of Classification Search
CPC .... G06Q 30/00; G06Q 30/02; G06Q 30/0241; G06Q 30/0251; G06Q 30/0255
USPC ......................................... 725/12; 705/14.46
See application file for complete search history.

(56) References Cited

U.S. PATENT DOCUMENTS

| 8,364,540 B2 | 1/2013 | Soroca et al. |
| 8,423,558 B2 | 4/2013 | Kilroy et al. |
| 2004/0181453 A1 | 9/2004 | Ray et al. |
| 2007/0067297 A1 | 3/2007 | Kublickis |
| 2008/0109306 A1* | 5/2008 | Maigret ............... G06F 21/10 705/14.46 |
| 2008/0235085 A1 | 9/2008 | Kovinsky et al. |
| 2009/0298480 A1 | 12/2009 | Khambete et al. |
| 2011/0196871 A1 | 8/2011 | Kilroy et al. |
| 2013/0086178 A1* | 4/2013 | Osborne ............... G06Q 30/00 709/206 |
| 2013/0167168 A1* | 6/2013 | Ellis ................... H04N 5/44543 725/12 |

FOREIGN PATENT DOCUMENTS

WO    WO 2009/126941 A1    10/2009

OTHER PUBLICATIONS

Disable Avira in Product Messaging (IPM), downloaded from: http://www.avira.com/en/support-for-home-knowledgebase-detail/kbid/1197, on Feb. 10, 2014, 3 pgs.

In Product Messages, downloaded from: http://avira.helpmax.net/en/help-center/in-product-messages/, on Feb. 10, 2014, 1 pg.

* cited by examiner

*Primary Examiner* — Marilyn G Macasiano
(74) *Attorney, Agent, or Firm* — Keller Jolley Preece

(57) ABSTRACT

A computer implemented method and apparatus for displaying IPM messages based on an individual's past message interaction. The method comprises displaying an in-product message of a first plurality of in-product messages associated with a first product feature of a plurality of available product features; receiving an input with the displayed in-product message; based on the received input, determining that a threshold is not met; and displaying an in-product message of a second plurality of in-product messages associated with a second product feature of the plurality of available product features when the threshold is not met.

20 Claims, 3 Drawing Sheets

METHODS AND APPARATUS FOR DISPLAYING IN-PRODUCT MESSAGES BASED ON AN INDIVIDUAL'S PAST MESSAGE INTERACTION

BACKGROUND OF THE INVENTION

Field of the Invention

Embodiments of the present invention generally relate to in-product messaging (IPM) and, more particularly, to a method and apparatus for displaying IPM messages based on an individual's past message interaction.

Description of the Related Art

With the ubiquity of software applications, such as ADOBE® READER®, advertising of product features available for purchase within these software applications is a key marketing opportunity. In-Product Messaging (IPM) involves creating IPM messages and pushing the IPM messages to client machines running software applications that subsequently display the IPM messages in the software applications according to conditions under which the IPM message should be displayed. Every click by a user on an IPM message is a marketing/sales opportunity. However, IPM messages may be related to a product feature that is of no interest to a specific user. It is a wasted advertising opportunity to display messages to an individual who have already shown a lack of interest in the product feature of the IPM message.

Therefore, there is a need for an improved method and apparatus for displaying IPM messages.

SUMMARY OF THE INVENTION

A method for displaying IPM messages based on an individual's past message interaction is described. The method displays an in-product message of a first plurality of in-product messages associated with a first product feature of a plurality of available product features. The method receives an input with the displayed in-product message. When the method identifies a lack of user interest in the first product feature, the method displays an in-product message of a second plurality of in-product messages associated with a second product feature of the plurality of available product features.

In another embodiment, an apparatus for displaying IPM messages based on an individual's past message interaction is described. The apparatus includes an IPM client module that displaying an in-product message of a first plurality of in-product messages associated with a first product feature of a plurality of available product features and receives an input with the displayed in-product message. When the IPM client module identifies a lack of user interest in the first product feature, the IPM client module displays an in-product message of a second plurality of in-product messages associated with a second product feature of the plurality of available product features.

In yet another embodiment, a computer readable medium for displaying IPM messages based on an individual's past message interaction is described. The computer readable medium includes instructions that cause a processor to perform the method of displaying IPM messages based on an individual's past message interaction.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
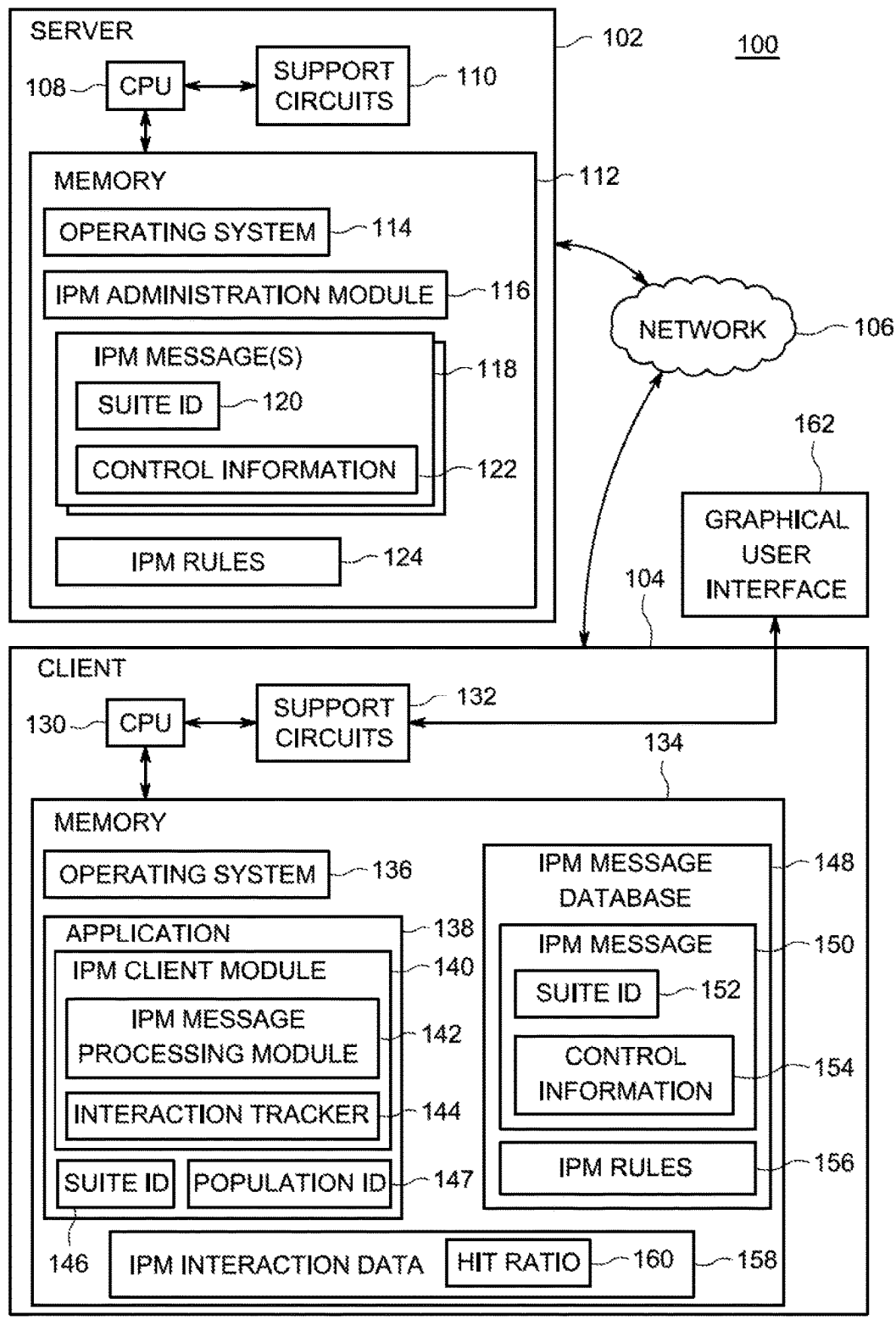
FIG. 1 is a block diagram of a system for displaying IPM messages based on an individual's past message interaction, according to one or more embodiments.

While the method and apparatus is described herein by way of example for several embodiments and illustrative drawings, those skilled in the art will recognize that the method and apparatus for displaying IPM messages based on an individual's past message interaction is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for displaying IPM messages based on an individual's past message interaction defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As previously explained, existing solutions continue to display IPM messages to an individual who has already shown a lack of interest in the product feature of the IPM message. This results in wasted advertising opportunities.

Thus, in accordance with an embodiment of the present invention, techniques are provided herein that allow for displaying IPM messages based on an individual's past message interaction. A marketer creates a plurality of IPM messages related to a product or product feature. The IPM messages are displayed to a user when the user navigates a software application. The IPM messages are displayed according to control information created by the marketer. The control information includes a display location and a context in which the IPM message is displayed. The control information identifies how and where each IPM message is displayed. Typically, IPM messages related to a same product or product feature are in a same group, hereafter referred to as a suite. When the marketer creates an IPM message, he or she assigns a suite ID to the IPM message. A suite of IPM messages may correspond to a category of products, related features of a product, or to a particular product feature. For example, the marketer may create a suite of IPM messages related to the product ExportPDF that are to be displayed when a user navigates, for example, ACROBAT.

In some embodiments, the software application randomly selects a first suite of IPM messages to display to the user. In some embodiments, the marketer controls what percentage of users view a particular suite of IPM messages. A population is defined as all users who use a particular software application. The marketer controls what percentage of users in the population view a particular suite of IPM messages. In such embodiments, the marketer identifies population IDs, which are created when a user launches a software application for a first time. The marketer arranges the population IDs in ranges, such that a user's inclusion in a range population IDs defines the suite of IPM message that are displayed to the user. For example, if there are five suites of IPM messages, the marketer may assign all users with a population ID within the range 1-25 to view IPM messages in suite1. Similarly, the marketer may assign users with a population ID within the range 26-70 view IPM messages in suite2, users with population ID within the range 71-80 to view IPM messages in suite3, users with a population ID within the range 81-90 to view IPM messages in suite4, and users with a population ID within the range 91-100 to view IPM messages in suite5.

When a user launches a software application, the software application assigns a population ID to the user. The software application selects a random number, using for example a random number generator, from a range of, for example 1-100. The selected number is the user's population ID. The population ID of the user determines a first suite of IPM messages that are displayed to the user during the use of the software application. In the present example, if a user's population ID is selected at random to be 83, then based on the marketer's assignments, the user is displayed IPM messages in suite4. As a user interacts with the first suite of IPM messages, the user's interactions are tracked by the software application. For example, the user may view an IPM message and either click on the message or ignore the message. Each time a message is displayed, a number of times the IPM message is displayed at the location where the IPM message is displayed is incremented. Each time a user clicks on the message, a number of times a user clicked on the IPM message at a location where the IPM message is displayed is incremented. Triggers are defined by the marketer at the time of IPM creation for each suite of IPM messages, such that when a trigger condition is met, the user is automatically assigned to a second suite of IPM messages. For example, a trigger condition includes a "hit ratio" that identifies a percentage of times the user clicked on an IPM message at the given location based on the total number of times an IPM message was displayed at the location. The trigger condition also includes a minimum display count, such that the trigger condition is not met until an IPM message for the given location has been displayed a predefined number of times. If the hit ratio falls below a threshold specified in the trigger condition and the minimum display count has been reached, a lack of interest is identified and a change in IPM message suite is triggered. Hence, when a user repeatedly ignores (i.e., shows a lack of interest in) IPM messages for a particular product feature, the software application automatically assigns a new suite of IPM messages to be displayed to the user. In some embodiments, the new suite ID assigned to the user is identified from the trigger condition. For example, the trigger may indicate that upon triggering a change in suite ID, assign the user to suite ID suite4. In some embodiments, the trigger indicates that upon triggering a change in suite ID, the suite ID is incremented. In such case, if a user was viewing IPM messages with a suite ID of suite2, the user is assigned to view a new suite of IPM messages, namely IPM messages with a suite ID of suite 3. Providing IPM messages of interest to the user increases the click-through rate, thereby increasing revenue opportunities.

As used herein, a "location" where an IPM message can be displayed in a software application generally refers to a pane or panel within the software application, such as a "Tools" panel or a "Share" pane. A hit ratio, described in detail later, is a measure of the effectiveness of a given IPM message at a given display location. In one example, the hit ratio is expressed as a percentage of successful click-throughs for the IPM message and location combination.

Advantageously, applications such as ADOBE READER can use the present invention to increase click through rates of IPM messages. By removing IPM messages related to a product feature in which a user has shown a lack of interest, the user is more likely to be presented with IPM messages for product features in which the user has an interest. Maximizing IPM clicks increases sales by leveraging user interactions with such IPM messages within the application that displays IPM. The present invention provides a policy where the suite of IPM messages presented to the user on a user device is determined based on IPM interactions of the user. Although the triggers for changing the suite of IPM messages that are presented may change on the server, user privacy is not impacted.

Various embodiments of a method and apparatus for displaying IPM messages based on an individual's past message interaction are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for displaying IPM messages based on an individual's past message interaction, according to one or more embodiments. The system 100 includes a server 102 and a client 104, communicatively coupled to one another via a network 106. The server 102 is a type of computing device that may be used for providing computing services within the cloud, e.g., a blade server, virtual machine. The server 102 includes a Central Processing Unit (CPU) 108, support circuits 110, and a memory 112. The CPU 108 may include one or more commercially available microprocessors or microcontrollers that facilitate data processing and storage. The various support circuits 110 facilitate the operation of the CPU 108 and include one or more clock circuits, power supplies, cache, input/output circuits, and the like. The memory 112 includes at least one of Read Only Memory (ROM), Random Access Memory (RAM), disk drive storage, optical storage, removable storage and/or the like.

The memory 112 includes an operating system 114, IPM administration module 116, one or more IPM message(s) 118, and IPM rules 124. Each IPM message 118 includes a suite ID 120 and control information 122. The operating system 114 may include various commercially known operating systems.

The client 104 is a computing device, such as a desktop computer, laptop, tablet computer, and the like, that includes or is connected to a graphical user interface 162. The client 104 includes a Central Processing Unit (CPU) 130, support circuits 132, and a memory 134. The CPU 130 may include one or more commercially available microprocessors or microcontrollers that facilitate data processing and storage. The various support circuits 132 facilitate the operation of the CPU 130 and include one or more clock circuits, power supplies, cache, input/output circuits, and the like. The memory 134 includes at least one of Read Only Memory (ROM), Random Access Memory (RAM), disk drive storage, optical storage, removable storage and/or the like.

The memory 134 includes an operating system 136, an application 138, an IPM message database 148, and IPM interaction data 158. The operating system 136 may include various commercially known operating systems. The application 138 may be any desktop or mobile software application, such as ADOBE® ACROBAT®, ADOBE® READER®, and the like, capable of interacting with an end-user of client 104. It is noted that in some embodiments, portions of client 104 may be implemented as a virtual machine without departing from the invention. The application 138 includes an IPM client module 140, a suite ID 146, and a population ID 147. The IPM client module 140 includes an IPM message processing module 142 and an interaction tracker 144.

The IPM message database 148 stores one or more IPM messages 150 and IPM rules 156 that are received from the server 102. When the application 138 is launched, the IPM client module 140 determines whether there are IPM messages 150 and IPM rules 156 on the client 104. If there are neither IPM messages 150 nor IPM rules 156 (i.e., on first launch of the application 138), the IPM client module 140 requests the IPM messages 150 and IPM rules 156 from the server 102. However, if IPM messages 150 and IPM rules 156 are on the client 104, the IPM client module 140 determines how much time has passed since the IPM messages 150 and IPM rules 156 were received. If the time is greater than a predefined threshold, for example six days, the IPM client module 140 request IPM messages 150 and IPM rules 156 from the server 102. Each IPM message 150 includes a suite ID 152 and control information 154. The IPM interaction data 158 includes a hit ratio 160 for each location and message context within the application 138.

The network 106 includes a communication system that connects computers (or devices) by wire, cable, fiber optic and/or wireless link facilitated by various types of well-known network elements, such as hubs, switches, routers, and the like. The network 106 may be a part of the Intranet using various communications infrastructure, such as Ethernet, Wi-Fi, a personal area network (PAN), a wireless PAN, Bluetooth, Near field communication, and the like.

IPM messages 118 are created by a marketer using the IPM administration module 116. The marketer groups the IPM messages 118 into a message suite of related IPM messages 118. For example, a plurality of IPM messages 118 related to the product feature ExportPDF. Each IPM message 118 related to the product feature ExportPDF are in a same message suite and are therefore assigned with a same suite ID 120 by the marketer. There may be five, ten, or more message suites, each with its own suite ID 120. Each IPM message 118 is also associated with control information 122. The control information 122 includes at least a location within the application 138 where the IPM message 118 is to be displayed. The IPM administration module 116 is also used to create IPM rules 124. IPM rules 124 identify when a first suite of messages for display is to be replaced by a second suite of messages for display. For example, if a suite of IPM messages related to ExportPDF are currently displayed to a user, an IPM rule may be: "if an IPM message is displayed eight or more times at a specified location and the user has clicked on the IPM message less than twice, then stop displaying messages related to ExportPDF and begin displaying a different suite of IPM messages related to, for example, ADOBE ACROBAT Document Services". The IPM rules 124 identify when a user has shown a sufficient lack of interest in a given product feature. When the lack of interest is identified, further display of an IPM message 118 related to that product feature is a wasted marketing opportunity. Displaying an IPM message 118 related to a different product feature that may be of interest to a user improves click through rates for the IPM messages. The generated IPM messages 118 and IPM rules 124 are stored on the client in the IPM message database 148.

In some embodiments, the IPM administration module 116 may be used to associate message suites with user populations. For example, a marketer may want 5% of a user population to see IPM messages 118 from suite1, 50% of the user population to see IPM messages 118 from suite2, 40% of the user population to see IPM messages 118 from suite3, and 5% of the user population to see IPM messages 118 from suite4. The IPM administration module 116 is used to define subgroups within the user population. Each subgroup is defined by a range of populationsIDs. Each population ID is randomly generated by the IPM client module 140. For example, the IPM client module 140 generates a random number between, for example 1 and 100 and stores it as population ID 147. A marketer may control the percentage of users who see a message suite using the populationID. In the above example, populationA may be users who have populationIDs of 1-5. Users in populationA are initially assigned to see IPM messages 118 from suite1. PopulationB users may have populations IDs of 6-54. Users in populationB are initially assigned to see IPM messages 118 from suite2. PopulationC users may have populations IDs of 55-95. Users in populationC are initially assigned to see IPM messages 118 from suite3. PopulationD users may have populations IDs of 96-100. Users in populationD are initially assigned to see IPM messages 118 from suite4. Any distribution of populations IDs may be used to assign message suites.

In other embodiments, the IPM client module 140 calculates the number of message suites and randomly generates a number between 1 and the number of message suites. For example, if four message suites exist, the IPM client module 140 randomly generates a number between 1 and 4. The selected number is associated with a suite ID 146.

When the application 138 is launched, the application identifies the suite ID 146. If the suite ID 146 does not exist, for example, if the application is launching for the first time, the IPM client module 140 generates the suite ID 146 by either randomly selecting a suite ID from the available suite IDs or by randomly selecting a population ID and determining the associated suite ID, as described above. In either case, the suite ID 146 identifies what IPM messages 150 are to be displayed during use of the application 138. The IPM client module 140 then determines whether there are IPM messages 150 and IPM rules 156 on the client 104. If there are neither IPM messages 150 nor IPM rules 156, the IPM client module 140 requests them from the server 102. However, if IPM messages 150 and IPM rules 156 are on the client 104, the IPM client module 140 determines how much time has passed since the IPM messages 150 and IPM rules 156 were received. If the time is greater than a predefined threshold, for example six days, the IPM client module 140 request IPM messages 150 and IPM rules 156 from the server 102. When IPM messages 150 are received, the IPM messages 150 are stored in the IPM message database 148. IPM rules 156 are also stored in the IPM message database 148. IPM rules 156 define conditions that trigger a change in the suite ID 146. If the IPM messages 150 or the IPM rules 156 are older than a pre-defined threshold, for example, six (6) days, the IPM client module 140 requests IPM messages 118 and IPM rules 124 from the server 102 and stores them as the IPM messages 150 and IPM rules 156 in the IPM message database 148. Although all IPM messages 118 are received from the server 102 and stored as IPM messages 150, only IPM messages 150 that are associated with the suite ID 152 that matches the suite ID 146 are used for display in the application 138.

As the user navigates the application 138, for example to a Tools Pane, a Comment pane, or a Share Pane, the IPM message processing module 142 displays the IPM messages 150 according to the control information 154. The control information 154 identifies at what location in the application 138 to display the IPM messages 150 via the graphical user interface 162. Each time the IPM message processing module 142 displays an IPM message 150, the interaction tracker 144 records a user's interactions with the IPM message 150. The interaction tracker 144 stores information identified in the IPM rules 156. For example, the interaction tracker 144 may store a location where the IPM message 150 is displayed, a total number of messages displayed at the given location and a message context, a total number of IPM messages 150 clicked on at the given location and message context, and the like. Each location is a specific display area within the application 138. For example, in ADOBE READER, a location may be a Gateway, a SharePane, a Toolbar, and the like. A message context is the context in which an IPM message is displayed, for example, a FirstUseIPM, a SecondUseIPM, a SignUp Top Panel, a SignUp Bottom Panel, and the like. For example, an IPM message 150 is displayed in ACROBAT when a user selects a Share pane, and this is the first time an IPM message 150 is displayed on the Share pane. The interaction tracker 144 increments a number of messages displayed at the Share pane for a first time. If the user clicks on the IPM message 150, a number of messages clicked on the Share pane, when the IPM message 150 is displayed the first time is also incremented. The interaction tracker 144 stores the data as IPM interaction data 158. The interaction tracker 144 calculates a hit ratio 160 for the given display location and message context. The hit ratio 160 is calculated as the number of messages clicked on for a given display location and message context divided by the total number of messages displayed at the given display location and message context. The hit ratio 160 is stored in the IPM interaction data 158.

The next time the application 138 is launched, the IPM client module 140 determines whether a change in suite ID 146 is necessary due to an identified lack of user interest in the IPM messages 150 associated with the current suite ID 146. The determination is dependent on the IPM rules 156. For example, the IPM rules 156 may state that if the hit ratio 160 is below a given threshold, the suite ID 146 is changed. However, the IPM rules 156 may also include a minimum display count that states that an IPM message 150 must be displayed at least a pre-defined number of times before the suite ID 146 is changed.

In some embodiments, the IPM rules 156 are evaluated each time the hit ratio 160 is updated for a given location and message context. If the IPM rules 156 are met, the suite ID 146 is changed. In some embodiments, the IPM rules 156 are evaluated when the application 138 launches and if met, the suite ID 146 is changed at launch time.

In some embodiments, the suite ID 146 is changed based on information in the IPM rules 156. For example, an IPM rule 156 may state that if the suite ID 146 is suite3, change the suite ID 146 to suite 5. In some embodiments, the suite ID 146 is changed to a suite ID 146 by randomly selecting a suite ID 146. When the suite ID 146 is changed, the IPM messages 150 associated with the previous suite ID 146 are de-activated and the IPM messages 150 associated with the new suite ID 146 are activated. As such, the suite of messages targeted to an individual user is based on an input with IPM messages 150. In one example, the input is in the form of a user interaction, for example, clicking on the IPM message 150. The suite of messages seen by a user is changed without affecting other users in the user population. In addition, the suite of messages is targeted to the individual user anonymously, without a marketer knowing what IPM messages 150 are targeted to which users.

Figure 2:
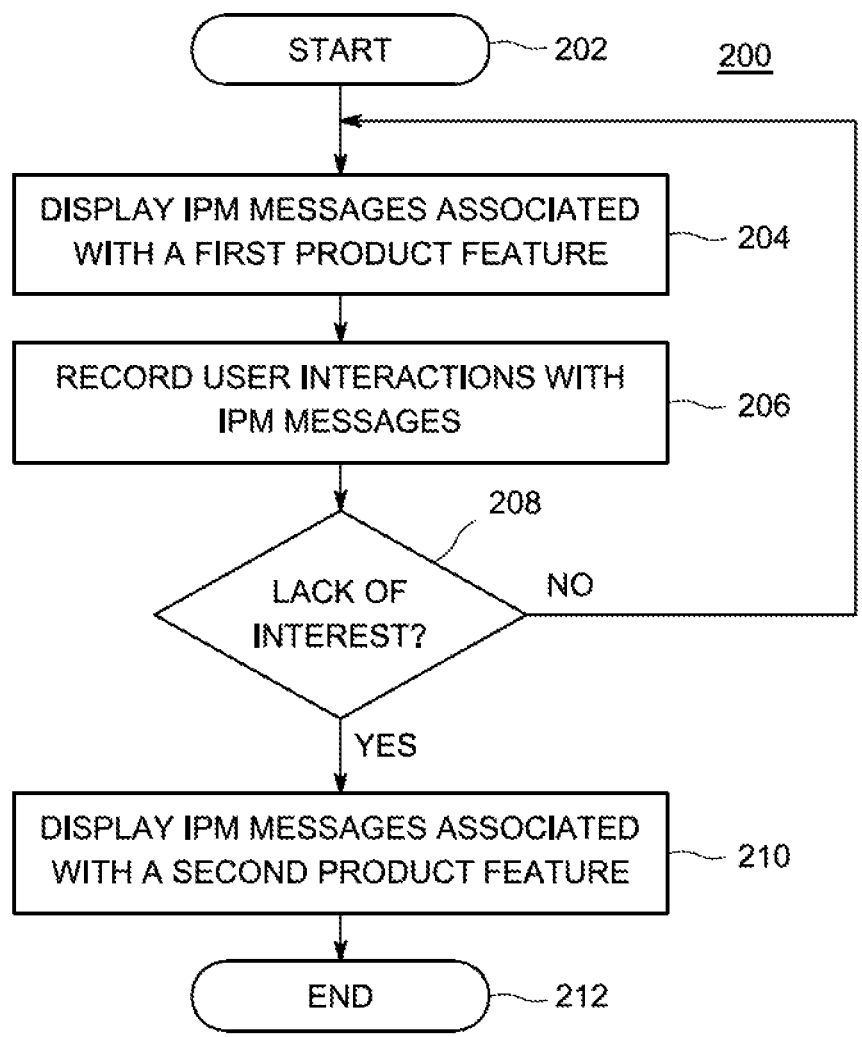
FIG. 2 depicts a flow diagram of a method for displaying IPM messages based on an individual's past message interaction as performed by the IPM client module of FIG. 1, according to one or more embodiments.

FIG. 2 is a flowchart of a method 200 for displaying IPM messages based on an individual's past message interaction as performed by the IPM client module 140 of FIG. 1, according to one or more embodiments. The method 200 displays a first suite of messages associated with a first product feature until a set of rules are met, where the rules identify a lack of user interest in the first product feature. When the rules are met, the method 200 displays a second suite of messages associated with a second product feature. The method 200 starts at step 202 and proceeds to step 204.

At step 204, the method 200 displays IPM messages associated with a first product feature. The IPM messages are associated with a same suite ID. The method 200 displays IPM messages according to control information that define a location in a software application the IPM messages are displayed. For example, a first message in the IPM messages for the first product feature may be displayed at a SharePane panel in the software application. A second message in the IPM messages for the first product feature may be displayed at a Gateway panel in the software application. A third message in the IPM message for the first product feature may be displayed in a Tools panel in the software application.

The method 200 proceeds to step 206, where the method 200 records inputs with the IPM messages. For example, the input may be in the form of a user interaction with the IPM message, such as clicking on the IPM message. The method 200 accesses IPM rules that identify a lack of user interest in a product feature. For example, IPM rules may state that when a hit ratio falls below a pre-defined threshold after the IPM message is displayed a minimum number of times, the suite ID is changed.

An IPM rule may be as follows:

```
<triggers>
    <trigger display_location="SharePane" message_context="all" hit_ratio="10" priority="1" minDisplayCount="8">
        <suite old ="suite2" new="suite3" />
    </trigger> display_location="SharePane" message_context="SignInPane" hit_ratio="5" priority="2" minDisplayCount="10"/>
</triggers>
```

In the example, the suite of messages displayed is suite2. The first trigger defines that if the hit ratio of the IPM message from suite 2 at the SharePane location becomes less than 10% and the IPM message from suite2 has been displayed 8 or more times, then the suite ID is changed from suite2 to suite3.

The method 200 determines the data required to evaluate the IPM rules and records the data. For example, the hit ratio is calculated using a number of messages for a given display location and message context, and a total number of IPM messages displayed on the given location and message context. In the current example, a minimum display count is also needed. Each time the method 200 displays an IPM message, the method 200 records the required data.

The method 200 proceeds to step 208, where the method 200 determines whether a lack of user interest is shown in the first product feature that requires a change in suite of message displayed in the application. In one embodiment, the method 200 determines a lack of interest by identifying when a hit ratio for a suite of messages falls below a pre-defined threshold. The method 200 calculates the hit ratio for the location where the IPM message is displayed and the message context. The hit ratio may be calculated as follows:

$$\text{hit ratio} = \frac{\text{number of messages clicked on for a given location and message context}}{\text{total number of messages displayed at the given location and message context}}$$

The method 200 stores the hit ratio. If the hit ratio is below a pre-defined threshold the method 200 identifies a lack of user interest in the first product feature. If the method 200 identifies a lack of user interest, the method 200 evaluates the IPM rules to determine whether a second suite of messages is to be displayed. For example, the IPM rules may require minimum display count for the given location and message context.

If the hit ratio is above the threshold or the minimum display count has not been met, the method 200 proceeds to step 204, where the method 200 continues to display the IPM messages related to the first product feature and iterates until the hit ratio drops below the threshold and the minimum display count is met. However, if the hit ratio is below the threshold and the minimum display count is met, the method 200 proceeds to step 210, where the method 200 displays a second suite of IPM messages associated with a second product feature.

The method 200 accesses the IPM rules to determine whether the second suite of IPM messages is identified. In the above example, the IPM rules read that if the old suite=suite2, then the new suite=suite3. Hence the second suite of IPM messages is suite3. Suite3 is associated with a product feature different from suite2. If the IPM rules do not specify a new suite, the new suite of messages is determined at random from among the remaining message suites. The IPM messages associated with the new suite for a second product feature are displayed.

The method 200 proceeds to step 212 and ends.

Figure 3:
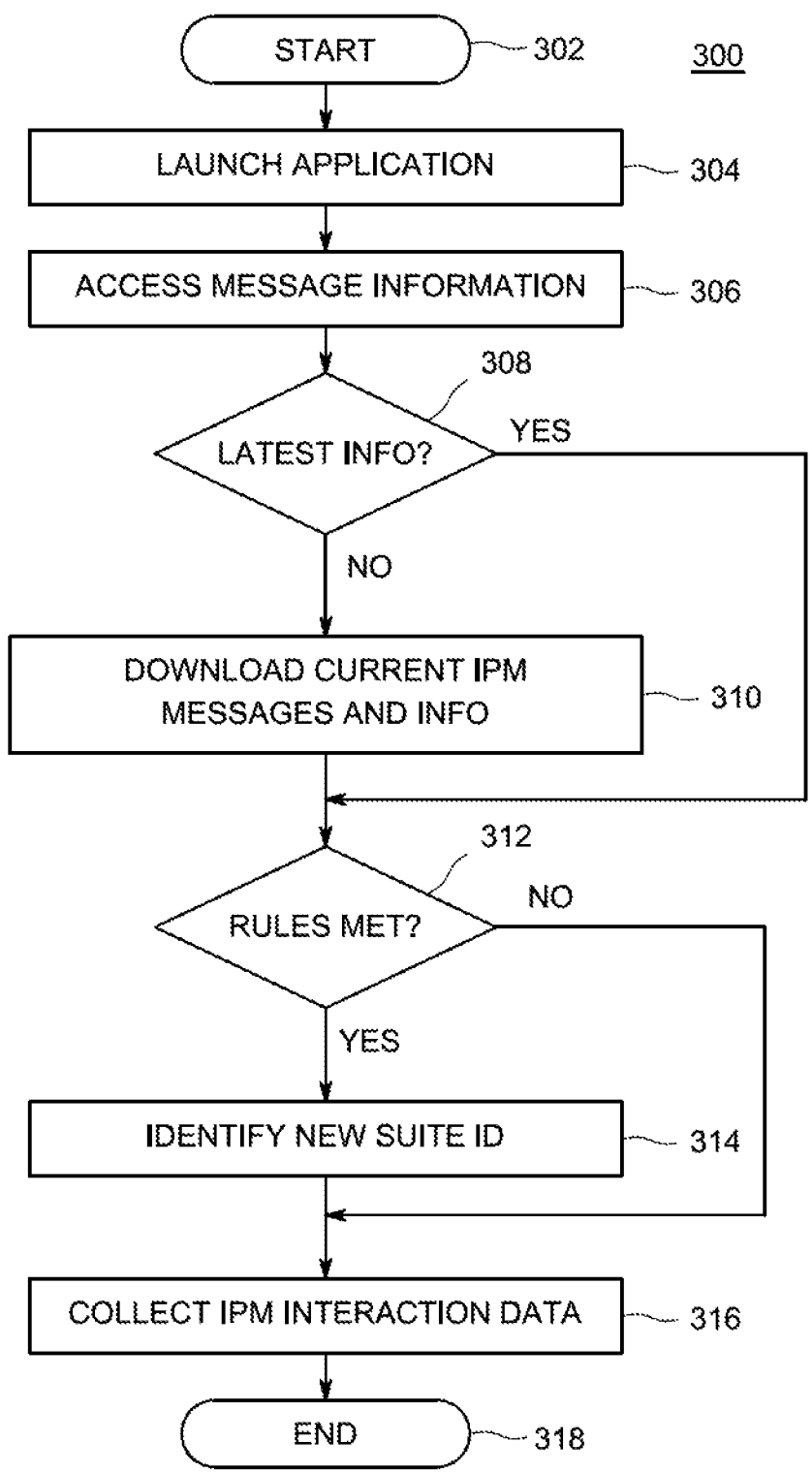
FIG. 3 depicts a flow diagram of a method for displaying IPM messages associated with a first product feature, as performed by the IPM client module of FIG. 1, according to one or more embodiments.

FIG. 3 depicts a flow diagram of a method 300 for displaying IPM messages associated with a first product feature, as performed by the IPM client module 140 of FIG. 1, according to one or more embodiments. The method 300 determines a suite of messages to be displayed in a software application. The method 300 starts at step 302 and proceeds to step 304.

At step 304, the method 300 launches a software application. For example, the software application may be ADOBE READER. The method 300 determines whether a suite ID exists. The suite ID determines what IPM messages are displayed in the software application. If no suite ID exists because, for example, the software application is being launched for a first time, a suite ID is determined. In some embodiments the suite ID is selected at random. In some embodiments, a population ID is generated that is associated with a suite ID.

The method 300 proceeds to step 306, where the method 300 accesses information regarding IPM messages. The method 300 accesses an IPM messages database that includes IPM messages and IPM rules to determine how long ago IPM messages and IPM rules were received from, for example, a marketing server.

The method 300 proceeds to step 308, where the method 300 determines if the length of time since receiving the IPM messages and IPM rules exceeds a pre-defined threshold, for example, six (6) days. If the method 300 determines the time since receiving IPM messages and IPM rules does not exceed the threshold, the method 300 proceeds to step 312. However, if the method 300 determines the time since receiving IPM messages and IPM rules exceeds the pre-defined threshold, the method 300 proceeds to step 310. At step 310, the method 300 downloads IPM messages and IPM rules and replaces the existing IPM messages and IPM rules with the downloaded IPM messages and IPM rules in the IPM messages database. The method 300 proceeds to step 312.

At step 312, the method 300 determines if any IPM rules are met. The method 300 accesses the IPM rules. The IPM rules defined when a change in suite ID is triggered. The rules are based on a user's interactions with IPM messages. As described above, the trigger may be based on a hit ratio and a minimum display count. If none of the IPM rules are met, no change in suite ID is triggered and the method 300 proceeds to step 316. However, if an IPM rule is met, the method 300 proceeds to step 314.

At step 314, the method 300 identifies a new suite ID. The method 300 identifies whether the new suite ID is defined in the IPM rules. If the new suite ID is defined, the new suite ID is stored as the suite ID. If no new suite ID is defined in the IPM rules, the new suite ID is selected at random from among the remaining message suite and stored. The method 300 accesses the IPM message database and deactivates the IPM messages associated with the previous suite ID and activates the IPM messages associated with the new suite ID. The method 300 proceeds to step 316.

At step 316, the method 300 collects IPM interaction data each time an IPM messages is displayed, as described above. The method 300 proceeds to step 318 and ends.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
providing, by at least one processor, a graphical user interface of a software application, the software application comprising a set of product features, wherein each product feature provides a different functionality to the software application;
identifying, by the at least one processor, a first plurality of in-product messages associated with a first product feature of a plurality of product features available to add to the software application;
displaying, within the graphical user interface of the software application, one or more in-product messages of the first plurality of in-product messages associated with the first product feature of the plurality of product features available to add to the software application;
tracking, by the at least one processor, user interactions with the one or more in-product messages of the first plurality of in-product messages associated with the first product feature;
based on the tracked user interactions with the one or more in-product messages of the first plurality of in-product messages associated with the first product feature, determining that a user-interaction threshold for interactions with the one or more in-product messages of the first plurality of in-product messages is not met;
based on the determination that the user-interaction threshold is not met:

identifying, by the at least one processor, a second plurality of in-product messages associated with a second product feature of the plurality of product features available to add to the software application; and displaying, within the graphical user interface of the software application, one or more in-product messages of the second plurality of in-product messages associated with the second product feature of the plurality of product features available to add to the software application in place of the one or more in-product messages of the first plurality of in-product messages associated with the first product feature.

2. The method of claim 1, wherein displaying the one or more in-product messages of the first plurality of in-product messages associated with the first product feature comprises displaying a first, second, and third in-product message of the first plurality of in-product messages associated with the first product feature to a specified user population in the graphical user interface of the software application at a first, second, and third display location specified by control information.

3. The method of claim 1, wherein determining that the user-interaction threshold is not met comprises identifying when a hit ratio for a given display location and for a given message context is below a pre-defined value.

4. The method of claim 3, wherein determining that the user-interaction threshold is not met is not identified until a plurality of in-product messages of the first plurality of in-product messages are displayed at the given location for the given message context a number of times that exceeds a minimum display threshold.

5. The method of claim 3, wherein the hit ratio is calculated as a number of in-product messages clicked on for the given display location and the given message context divided by a total number of messages displayed at the given display location and the given message context.

6. The method of claim 1, wherein identifying the second plurality of in-product messages associated with the second product feature comprises randomly selecting the second plurality of in-product messages from a database of in-product messages associated with the plurality of product features available to add to the software application; and displaying the one or more in-product messages of the second plurality of in-product messages associated with the second product feature comprises displaying the one or more in-product messages of the second plurality of in-product messages to a randomly selected subset of the specified user population in the graphical user interface of the software application.

7. The method of claim 1, wherein displaying the one or more in-product messages of the first plurality of in-product messages associated with the first product feature comprises:

displaying the one or more in-product messages of the first plurality of in-product messages at a first display location within the graphical user interface;

displaying the one or more in-product messages of the first plurality of in-product messages at a second display location within the graphical user interface; and based on detecting one or more user interactions with the one or more in-product messages of the first plurality of in-product messages at the first display location, incrementally increasing a number of displays of the one or more in-product messages of the first plurality of in-product messages at the first display location relative to the second display location.

8. A system comprising:
at least one processor; and
at least one non-transitory computer readable storage medium storing instructions that, when executed by the at least one processor, cause the system to:

provide a graphical user interface of a software application, the software application comprising a set of product features, wherein each product feature provides a different functionality to the software application;

identify a first plurality of in-product messages associated with a first product feature of a plurality of product features available to add to the software application;

display, within the graphical user interface of the software application, one or more in-product messages of the first plurality of in-product messages associated with the first product feature of the plurality of product features available to add to the software application;

track user interactions with the one or more in-product messages of the first plurality of in-product messages associated with the first product feature;

based on the tracked user interactions with the one or more in-product messages of the first plurality of in-product messages associated with the first product feature, determine that a user-interaction threshold for interactions with the one or more in-product messages of the first plurality of in-product messages is not met;

based on the determination that the user-interaction threshold is not met:

identify a second plurality of in-product messages associated with a second product feature of the plurality of product features available to add to the software application; and display one or more in-product messages of the second plurality of in-product messages associated with the second product feature of the plurality of product features available to add to the software application in place of the one or more in-product messages of the first plurality of in-product messages associated with the first product feature.

9. The system of claim 8, wherein the instructions that, when executed by the at least one processor, cause the system to determine that the user-interaction threshold is not met further cause the system to identify when a hit ratio for a given display location and for a given message context is below a pre-defined value.

10. The system of claim 9, wherein the instructions that, when executed by the at least one processor, cause the system to determine that the user-interaction threshold is not met further cause the system to determine that the user-interaction threshold is not met only after a plurality of in-product messages are displayed at the given display location for the given message context a number of times that exceeds a minimum display threshold.

11. The system of claim 9, wherein the instructions that, when executed by the at least one processor, cause the system to identify when the hit ratio is below a pre-defined value further cause the system to calculate the hit ratio as a number of in-product messages clicked on for the given display location and the given message context divided by a total number of messages displayed at the given display location and the given message context.

12. The system of claim 8, further comprising instructions that, when executed by the at least one processor, cause the system to:

identify the second plurality of in-product messages associated with the second product feature by randomly selecting the second plurality of in-product messages from a database of in-product messages associated with the plurality of product features available to add to the software application; and display the one or more in-product messages of the second plurality of in-product messages associated with the second product feature further by displaying the one or more in-product messages of the second plurality of in-product messages to a randomly selected subset of a user population in the graphical user interface of the software application.

13. The system of claim 8, further comprising instructions that, when executed by the at least one processor, cause the system to display the one or more in-product messages of the first plurality of in-product messages associated with the first product feature by:

displaying the one or more in-product messages of the first plurality of in-product messages at a first display location within the graphical user interface;

displaying the one or more in-product messages of the first plurality of in-product messages at a second display location within the graphical user interface; and based on detecting one or more user interactions with the one or more in-product messages of the first plurality of in-product messages at the first display location, incrementally increasing a number of displays of the one or more in-product messages of the first plurality of in-product messages at the first display location relative to the second display location.

14. A non-transitory computer readable medium storing computer instructions that, when executed by at least one processor, cause a computer system to:

provide a graphical user interface of a software application, the software application comprising a set of product features, wherein each product feature provides a different functionality to the software application;

identify a first plurality of in-product messages associated with a first product feature of a plurality of product features available to add to the software application;

display, within the graphical user interface of the software application, one or more in-product messages of the first plurality of in-product messages associated with the first product feature of the plurality of product features available to add to the software application;

track user interaction with the one or more in-product messages of the first plurality of in-product messages associated with the first product feature;

based on the tracked user interaction with the one or more in-product messages of the first plurality of in-product messages, determine that a user-interaction threshold for interactions with the one or more in-product messages of the first plurality of in-product messages is not met;

based on the determination that the user-interaction threshold is not met:

identifying a second plurality of in-product messages associated with a second product feature of the plurality of product features available to add to the software application; and display, within the graphical user interface of the software application, one or more in-product messages of the second plurality of in-product messages associated with the second product feature of the plurality of product features available to add to the software application in place of the one or more in-product messages of the first plurality of in-product messages associated with the first product feature.

15. The non-transitory computer readable medium of claim 14, further comprising instructions that, when executed by the at least one processor, cause the computer system to display the one or more in-product messages of the first plurality of in-product messages by displaying a first, second, and third message of the first plurality of in-product messages associated with the first product feature to a specified user population in the graphical user interface of the software application at a first, second, and third display location specified by control information.

16. The non-transitory computer readable medium of claim 14, further comprising instructions that, when executed by the at least one processor, cause the computer system to determine that the user-interaction threshold is not met by identifying when a hit ratio for a given display location and for a given message context is below a predefined value.

17. The non-transitory computer readable medium of claim 16, further comprising instructions that, when executed by the at least one processor, cause the computer system to determine that the user-interaction threshold is not met by determining that the user-interaction threshold is not met only after a plurality of in-product messages are displayed at the given display location for the given message context a number of times that exceeds a minimum display threshold.

18. The non-transitory computer readable medium of claim 16, further comprising instructions that, when executed by the at least one processor, cause the computer system to identify when the hit ratio is below a pre-defined value by calculating the hit ratio as a number of in-product messages clicked on for the given display location and the given message context divided by a total number of messages displayed at the given display location and the given message context.

19. The non-transitory computer readable medium of claim 15, further comprising instructions that, when executed by the at least one processor, cause the computer system to:

identify the second plurality of in-product messages associated with the second product feature by randomly selecting the second plurality of in-produce messages from a database of in-product messages associated with the plurality of product features available to add to the software application; and display the one or more in-product messages of the second plurality of in-product messages associated with the second product feature by displaying the one or more in-product messages of the second plurality of in-product messages to a randomly selected subset of the specified user population in the graphical user interface of the software application.

20. The non-transitory computer readable medium of claim 14, further comprising instructions that, when executed by the at least one processor, cause the computer system to display the one or more in-product messages of the first plurality of in-product messages associated with the first product feature by:

displaying the one or more in-product messages of the first plurality of in-product messages at a first display location within the graphical user interface;

displaying the one or more in-product messages of the first plurality of in-product messages at a second display location within the graphical user interface; and based on detecting one or more user interactions with the one or more in-product messages of the first plurality of in-product messages at the first display location, incrementally increasing a number of displays of the one or more in-product messages of the first plurality of in-product messages at the first display location relative to the second display location.

* * * * *